United States Patent
Poxleitner

Patent Number: 5,685,554
Date of Patent: Nov. 11, 1997

[54] TELESCOPING TOW BAR APPARATUS

[76] Inventor: Harold C. Poxleitner, Box 196, 302 Idaho St., Cottonwood, Id. 83522

[21] Appl. No.: 548,964

[22] Filed: Oct. 27, 1995

[51] Int. Cl.$^6$ .............................. B60D 1/167; B60D 1/44
[52] U.S. Cl. .............................. 280/491.2; 280/491.3; 280/493; 280/498
[58] Field of Search .................. 280/491.2, 491.3, 280/491.4, 491.1, 478.1, 479.2, 494, 492, 498, 501, 502, 503, 493, 495

[56] References Cited

U.S. PATENT DOCUMENTS

| | | | |
|---|---|---|---|
| D. 258,814 | 4/1981 | Stewart | D12/162 |
| 2,707,113 | 4/1955 | Powlick | 280/491.1 |
| 3,019,033 | 1/1962 | Wegener et al. | 280/493 |
| 3,384,891 | 5/1968 | Batke | 280/491.3 |
| 3,664,687 | 5/1972 | Nutt et al. | 280/491.3 |
| 3,797,846 | 3/1974 | Pevic | 280/493 |
| 4,433,853 | 2/1984 | Swaim | 280/491.4 |
| 4,509,769 | 4/1985 | Weber | 280/491.1 |
| 4,592,564 | 6/1986 | Warnock et al. | 280/402 |
| 4,856,805 | 8/1989 | Davis | 280/491.4 |
| 5,071,153 | 12/1991 | Duncan | 280/491.4 |
| 5,224,960 | 7/1993 | Duncan | 280/491.4 |
| 5,259,639 | 11/1993 | Whitley | 280/411.1 |
| 5,421,599 | 6/1995 | Maines | 280/491.2 |

*Primary Examiner*—Anne Marie Boehler

[57] ABSTRACT

A tow bar apparatus is attached to a vehicle to be towed and includes a vehicle attachment assembly which includes a transverse strut member and a pair of connector assemblies, attached to the transverse strut member, for attaching the vehicle attachment assembly to the vehicle to be towed. A first hinge assembly is connected to a first end of the transverse strut member. A second hinge assembly is connected to a second end of the transverse strut member. A first beam member, which includes a proximal end, is connected to the first end of the transverse strut member. A second beam member, which includes a proximal end, is connected to the second end of the transverse strut member. A joint assembly is connected to a distal end of the first beam member and to a distal end of the second beam member. The joint assembly includes a channel portion, and a telescopic beam assembly is received in the channel portion of the joint assembly. The telescopic beam assembly includes a towing-vehicle connection assembly connected to a distal end of the telescopic beam assembly. A stop member is connected to the proximal end of the telescopic beam assembly. The telescopic beam assembly has an in-use effective length when in an in-use mode and a shorter storage-mode effective length when in a storage mode.

2 Claims, 3 Drawing Sheets

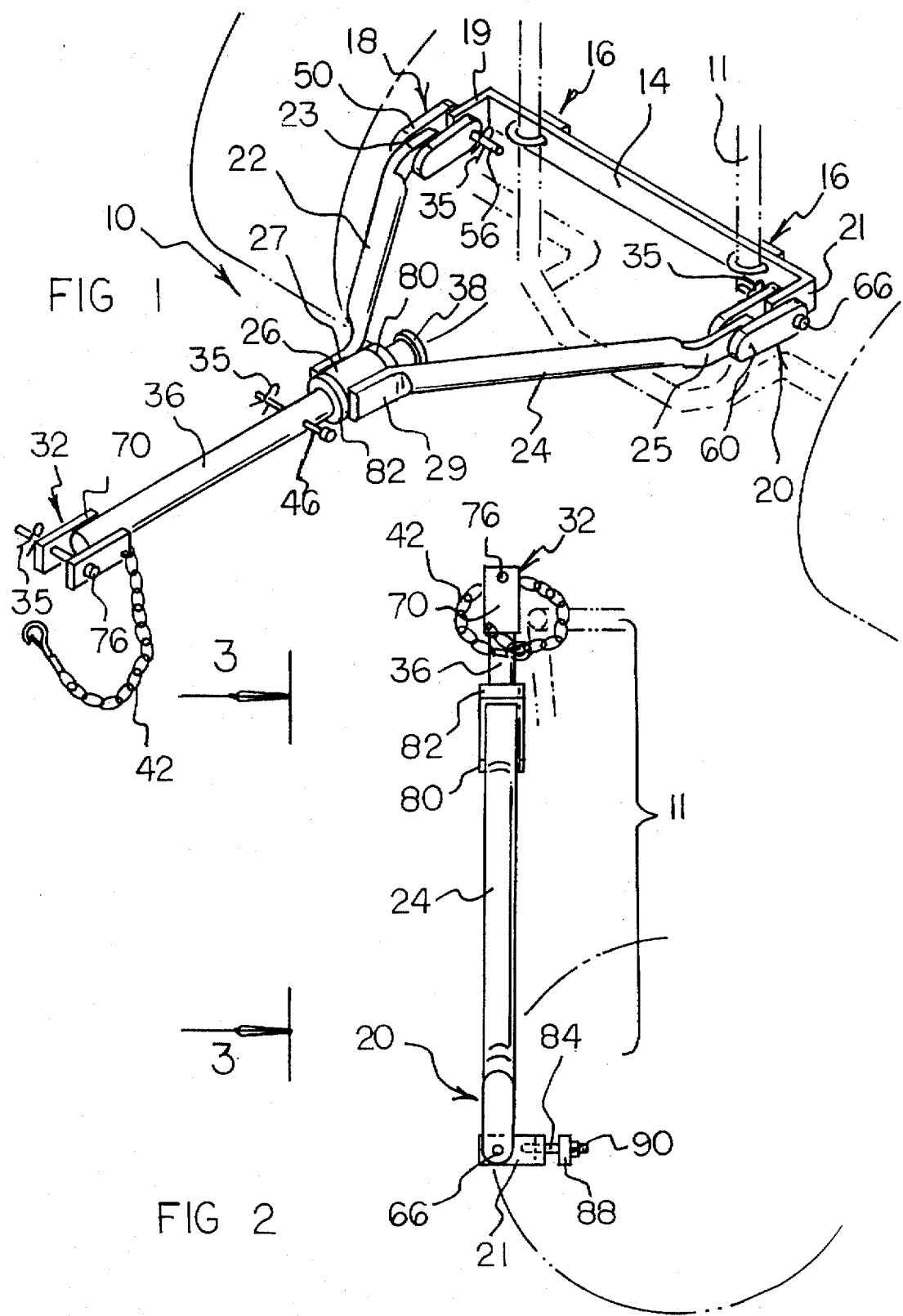

TELESCOPING TOW BAR APPARATUS

BACKGROUND OF THE INVENTION

1. Field of the Invention

The present invention relates generally to towing devices and, more particularly, to towing devices for towing one motor vehicle by another.

2. Description of the Prior Art

It often happens that one motor vehicle is used to tow another motor vehicle. It is of special interest when the towed motor vehicle is an all terrain vehicle (ATV). Often, an all terrain vehicle is towed by another motor vehicle along surfaced roads, and the all terrain vehicle is not employed independently until off-road conditions are reached. In this respect, it would be desirable if a towing device were provided that is especially suitable for towing an all terrain vehicle by a motor vehicle.

Some motor vehicles, such as passenger automobiles, are rarely towed. For such a towed vehicle, there is little desirability for the towed vehicle to carry a tow bar device. On the other hand, all terrain vehicles may often be towed, and, in this respect, it would be desirable if an all terrain vehicle carried a tow bar device.

For a tow bar device that is carried by an all terrain vehicle, the tow bar device must be relatively large in size when the tow bar device is being used for towing, in a towing mode. However, when the all terrain vehicle is used in the off-road environment, it would be desirable if the carried tow bar device could be reduced in its effective size, in a storage mode.

There are many all terrain vehicles currently in use that are not carrying their own tow bar devices that can be reduced in effective size in a storage mode. In this respect, it would be desirable if a towing device were provided that can be retrofitted to many currently in use all terrain vehicles.

It is well known in the art of towing all terrain vehicles that a triangular structure provides strength and balance to a tow bar device. In this respect, it would be desirable if a towing device were provided which utilizes a triangular structure to provide strength and balance to the tow bar device.

Conventional towing devices that are used for towing passenger automobiles, boats, and recreational trailers may not be suitable for towing an all terrain vehicle. This may be so because of the relatively low profile of an all terrain vehicle. In this respect, it would be desirable if a towing device were provided which is especially adapted for towing an all terrain vehicle.

Throughout the years, a number of innovations have been developed relating to towing all terrain vehicles, and the following U.S. Pat. Nos. are representative of some of those innovations: U.S. Pat. Nos. 4,592,564, 4,856,805, 5,071, 153, 5,224,960, 5,259,639, and Des. 258,814. More specifically, U.S. Pat. No. 4,592,564 discloses a towing device which requires the front portion of the all terrain vehicle to be lifted and placed in the towing device. For some persons, lifting the front end of an all terrain vehicle may be very difficult or otherwise undesirable. In this respect, it would be desirable if a towing device for an all terrain vehicle were provided which does not require a person to lift the front end of the all terrain vehicle to utilize the towing device.

Each of U.S. Pat. Nos. 4,856,805, 5,071,153, and 5,224, 960 discloses a towing device for an all terrain vehicle which utilizes a triangular structure in which one or more of the sides of the triangular structure are telescopic. Telescopic side of the triangular structure have an inherent disadvantage. By being telescopic, there is a possibility that the normally strong triangular structure can give way under forces exerted on a telescopic side. A lock securing a telescopic side of the triangular structure may give way under the forces exerted thereon. In this respect, it would be desirable if a towing device for an all terrain vehicle were provided which employs a triangular structure that does not have telescopic sides in the triangular structure.

U.S. Pat. No. 5,259,639 discloses a towing device for towing a plurality of all terrain vehicles. A triangular structure is not employed with this towing device. As a matter of interest, U.S. Pat. No. Des. 258,814 discloses a combined flush mounted tow bar and brush guard.

Thus, while the foregoing body of prior art indicates it to be well known to use towing devices for all terrain vehicles, the prior art described above does not teach or suggest a telescoping tow bar apparatus which has the following combination of desirable features: (1) is especially suitable for towing an all terrain vehicle by a motor vehicle; (2) is carried by an all terrain vehicle; (3) is especially adapted for towing an all terrain vehicle; (4) can be reduced in its effective size in a storage mode; (5) can be retrofitted to many currently in use all terrain vehicles; (6) utilizes a triangular structure to provide strength and balance to the tow bar apparatus; (7) does not require a person to lift the front end of the all terrain vehicle to utilize the towing apparatus; and (8) does not have telescopic sides in the triangular structure. The foregoing desired characteristics are provided by the unique telescoping tow bar apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a tow bar apparatus which is attached to a vehicle to be towed and includes a vehicle attachment assembly which includes a transverse strut member and a pair of connector assemblies, attached to the transverse strut member, for attaching the vehicle attachment assembly to the vehicle to be towed. A first hinge assembly is connected to a first end of the transverse strut member. A second hinge assembly is connected to a second end of the transverse strut member. A first beam member, which includes a proximal end, is connected to the first end of the transverse strut member. A second beam member, which includes a proximal end, is connected to the second end of the transverse strut member. A joint assembly is connected to a distal end of the first beam member and to a distal end of the second beam member. The joint assembly includes a channel portion, and a telescopic beam assembly is received in the channel portion of the joint assembly. The telescopic beam assembly includes a towing-vehicle connection assembly connected to a distal end of the telescopic beam assembly. A stop member is connected to the proximal end of the telescopic beam assembly.

The first end and the second end of the transverse strut member are oriented at right angles to a central portion of said transverse strut member between the first end and the second end. The distal end, a central portion, and the proximal end of the first beam member are in a sigmoidal-shaped form. Similarly, the distal end, a central portion, and the proximal end of the second beam member are in a sigmoidal-shaped form. The transverse strut member, the first hinge assembly, the first beam member, the joint assembly, the second beam member, and the second hinge assembly form a substantially triangular structure.

The telescopic beam assembly includes a channel-received beam member received in the channel portion of the joint assembly. A stop member is attached to a proximal end of the channel-received beam member.

The first hinge assembly includes a first hinge plate assembly connected to the proximal end of the first beam member. Pin apertures are located in the first hinge plate assembly. A pin aperture is located in the first end of the transverse strut member. A first hinge pin is placed in registration with the pin apertures in the first hinge plate assembly and the pin aperture in the first end of the transverse strut member. The second hinge assembly includes a second hinge plate assembly connected to the proximal end of the second beam member. Pin apertures are located in the second hinge plate assembly. A pin aperture is located in the second end of the transverse strut member. A second hinge pin is placed in registration with the pin apertures in the second hinge plate assembly and the pin aperture in the second end of the transverse strut member.

A first bearing assembly is connected to a proximal end of the joint assembly, and a second bearing assembly is connected to a distal end of the joint assembly.

The towing-vehicle connection assembly includes a pair of plate members connected to a distal end of the channel-received beam member of the telescopic beam assembly. The plate members include pin apertures, and a towing-vehicle hinge pin is received by the pin apertures in the plate members.

The telescopic beam assembly further includes a safety chain connected to a distal end of the channel-received beam member. The telescopic beam assembly further includes apertures, located distal to the stop member, in the channel-received beam member. A lock pin is received in the apertures of the channel-received beam member.

Each connector assembly includes a U-shaped rod member which includes threaded ends, a pair of rod-receiving apertures in the transverse strut member, a brace plate which includes apertures, and nuts for connecting to the threaded ends of the U-shaped rod member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved telescoping tow bar apparatus which has all of the advantages of the prior art and none of the disadvantages.

It is another object of the present invention to provide a new and improved telescoping tow bar apparatus which may be easily and efficiently manufactured and marketed.

It is a further object of the present invention to provide a new and improved telescoping tow bar apparatus which is of durable and reliable construction.

An even further object of the present invention is to provide a new and improved telescoping tow bar apparatus which is susceptible of a low cost of manufacture with regard to both materials and labor, and which accordingly is then susceptible of low prices of sale to the consuming public, thereby making such telescoping tow bar apparatus available to the buying public.

Still yet a further object of the present invention is to provide a new and improved telescoping tow bar apparatus which is especially suitable for towing an all terrain vehicle by a motor vehicle.

Still another object of the present invention is to provide a new and improved telescoping tow bar apparatus that is carried by an all terrain vehicle.

Yet another object of the present invention is to provide a new and improved telescoping tow bar apparatus which is especially adapted for towing an all terrain vehicle.

Even another object of the present invention is to provide a new and improved telescoping tow bar apparatus that can be reduced in its effective size in a storage mode.

Still a further object of the present invention is to provide a new and improved telescoping tow bar apparatus which can be retrofitted to many currently in use all terrain vehicles.

Yet another object of the present invention is to provide a new and improved telescoping tow bar apparatus that utilizes a triangular structure to provide strength and balance to the tow bar apparatus.

Still another object of the present invention is to provide a new and improved telescoping tow bar apparatus which does not require a person to lift the front end of the all terrain vehicle to utilize the towing apparatus.

Yet another object of the present invention is to provide a new and improved telescoping tow bar apparatus that does not have telescopic sides in the triangular structure.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the telescoping tow bar apparatus of the invention attached to an all terrain and in an in-use mode.

FIG. 2 is a side view of the embodiment of the telescoping tow bar apparatus shown in FIG. 1 attached to the all terrain vehicle in a storage mode.

DESCRIPTION OF THE PREFERRED EMBODIMENT

Figure 3:
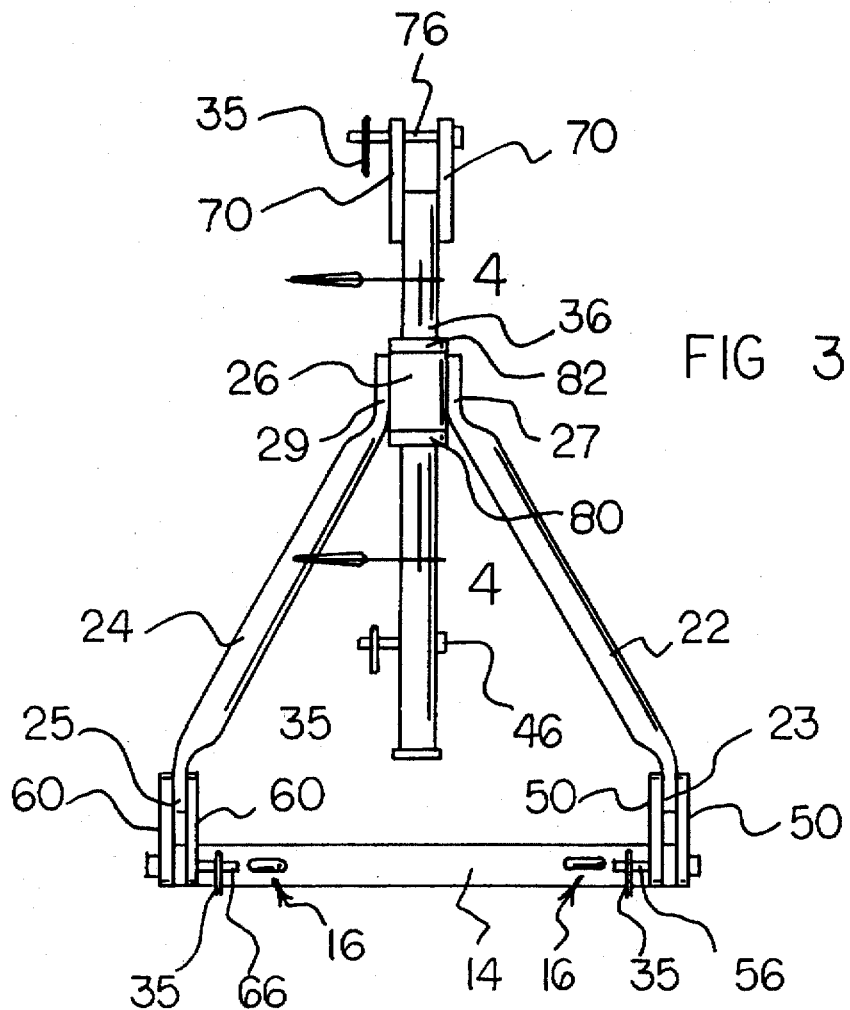
FIG. 3 is a front view of the embodiment of the telescoping tow bar apparatus of FIG. 2 taken along line 3—3 thereof with the all terrain vehicle removed.
Figure 4:
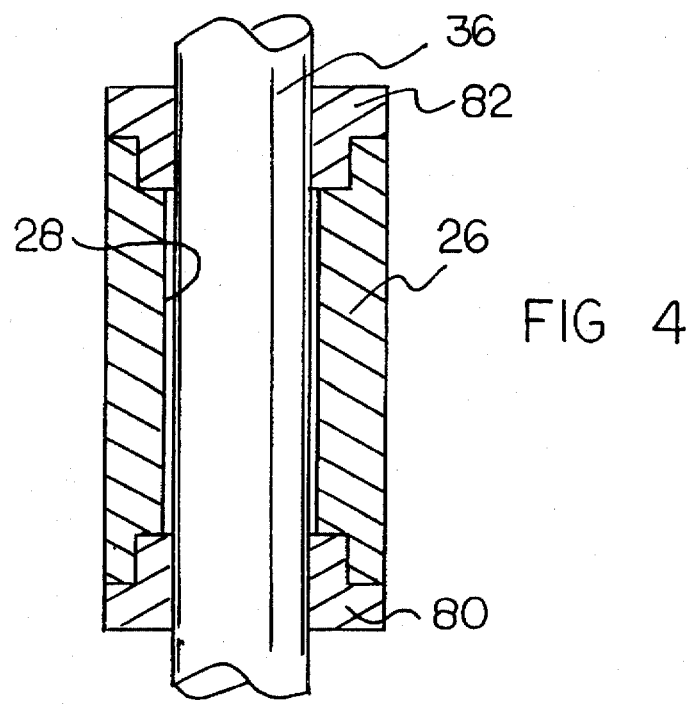
FIG. 4 is an enlarged partial cross-sectional view of the embodiment of the invention shown in FIG. 3 taken along line 4—4 thereof.
Figure 5:
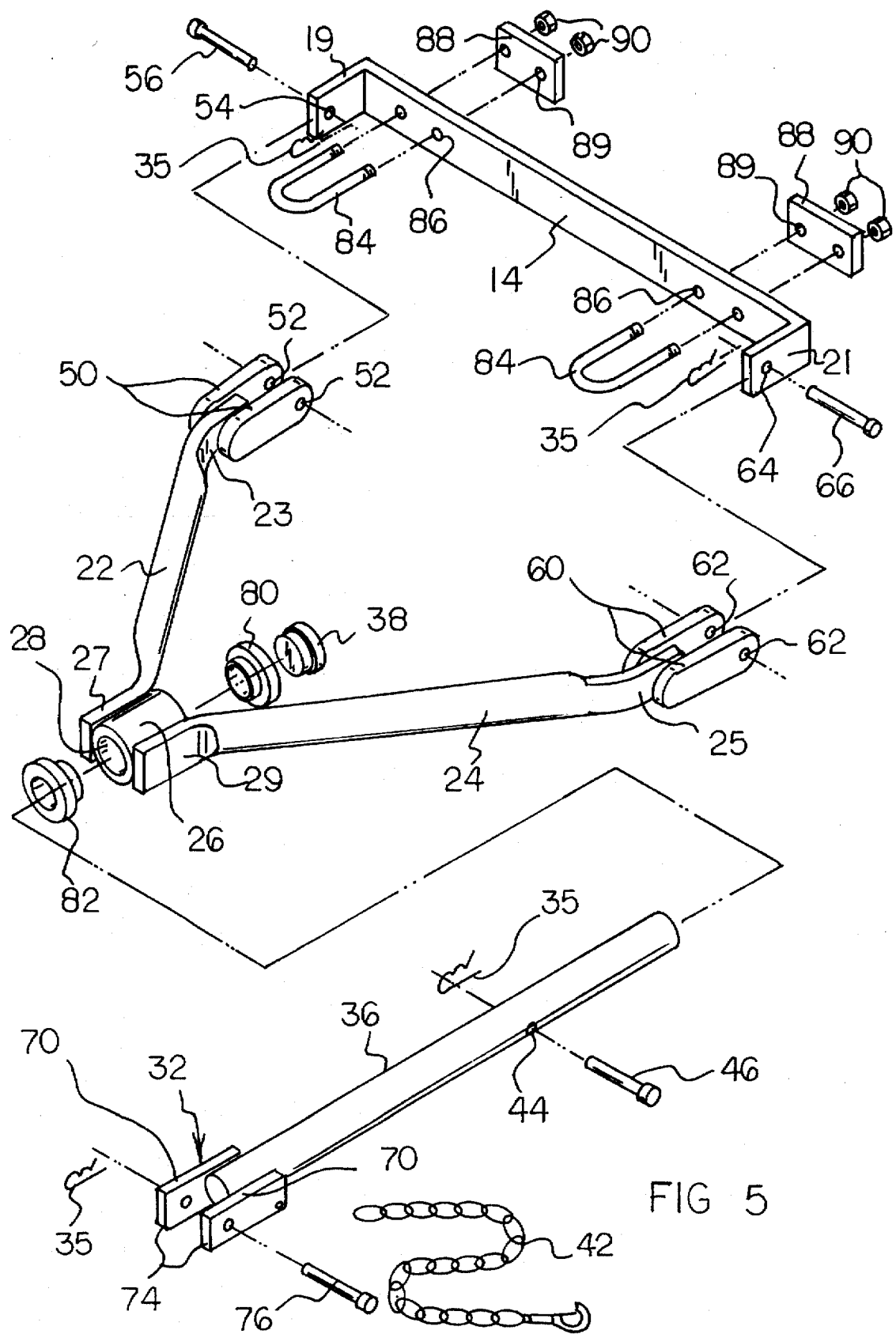
FIG. 5 is an exploded perspective view of the embodiment of the invention shown in FIGS. 1-4.

With reference to the drawings, a new and improved telescoping tow bar apparatus embodying the principles and concepts of the present invention will be described.

Turning to FIGS. 1-5, there is shown an exemplary embodiment of the telescoping tow bar apparatus of the invention generally designated by reference numeral 10. In its preferred form, telescoping tow bar apparatus 10 is attached to a vehicle to be towed 11 and includes a vehicle attachment assembly which includes a transverse strut member 14 and a pair of connector assemblies 16, attached to the transverse strut member 14, for attaching the vehicle attachment assembly to the vehicle to be towed 11. A first hinge assembly 18 is connected to a first end 19 of the transverse strut member 14. A second hinge assembly 20 is connected to a second end 21 of the transverse strut member 14. A first beam member 22, which includes a proximal end 23, is connected to the first end 19 of the transverse strut member 14. A second beam member 24, which includes a proximal end 25, is connected to the second end 21 of the transverse strut member 14. A joint assembly 26 is connected to a distal end 27 of the first beam member 22 and to a distal end 29 of the second beam member 24. The joint assembly 26 includes a channel portion 28, and a telescopic beam assembly is received in the channel portion 28 of the joint assembly 26. The telescopic beam assembly includes a towing-vehicle connection assembly 32 connected to a distal end of the telescopic beam assembly.

A stop member 38 is connected to the proximal end of the telescopic beam assembly. The stop member 38 prevents the channel-received beam member 36 from being pulled completely through the joint assembly 26. Therefore, the stop member 38 prevents the channel-received beam member 36 from being directly separated from the joint assembly 26 and from being indirectly separated from the first beam member 22, the second beam member 24, the first hinge assembly 18, the second hinge assembly 20, and the transverse strut member 14.

The first end 19 and the second end 21 of the transverse strut member 14 are oriented at right angles to a central portion of said transverse strut member 14 between the first end 19 and the second end 21. The distal end 27, a central portion, and the proximal end 23 of the first beam member 22 are in a sigmoidal-shaped form. Similarly, the distal end 29, a central portion, and the proximal end 25 of the second beam member 24 are in a sigmoidal-shaped form. The transverse strut member 14, the first hinge assembly 18, the first beam member 22, the joint assembly 26, the second beam member 24, and the second hinge assembly 20 form a substantially triangular structure.

The telescopic beam assembly includes a channel-received beam member 36 received in the channel portion 28 of the joint assembly 26. A stop member 38 is attached to a proximal end of the channel-received beam member 36.

The first hinge assembly 18 includes a first hinge plate assembly 50 connected to the proximal end of the first beam member 22. Pin apertures 52 are located in the first hinge plate assembly 50. A pin aperture 54 is located in the first end 19 of the transverse strut member 14. A first hinge pin 56 is placed in registration with the pin apertures 52 in the first hinge plate assembly 50 and the pin aperture 54 in the first end 19 of the transverse strut member 14. The second hinge assembly 20 includes a second hinge plate assembly 60 connected to the proximal end of the second beam member 24. Pin apertures 62 are located in the second hinge plate assembly 60. A pin aperture 64 is located in the second end 21 of the transverse strut member 14. A second hinge pin 66 is placed in registration with the pin apertures 62 in the second hinge plate assembly 60 and the pin aperture 64 in the second end 21 of the transverse strut member 14.

A first bearing assembly 80 is connected to a proximal end of the joint assembly 26, and a second bearing assembly 82 is connected to a distal end of the joint assembly 26. The first bearing assembly 80 and the second bearing assembly 82 serve to provide a smooth sliding action between the channel-received beam member 36 and the joint assembly 26 when the channel-received beam member 36 moves in the channel portion 28 of the joint assembly 26.

The towing-vehicle connection assembly 32 includes a pair of plate members 70 connected to a distal end of the channel-received beam member 36 of the telescopic beam assembly. The plate members 70 include pin apertures 74, and a towing-vehicle hinge pin 76 is received by the pin apertures 74 in the plate members 70.

The telescopic beam assembly further includes a safety chain 42 connected to a distal end of the channel-received beam member 36. The telescopic beam assembly further includes apertures 44, located distal to the stop member 38, in the channel-received beam member 36. A lock pin 46 is received in the apertures 44 of the channel-received beam member 36. A locking clip 35 can be employed at ends of each of the locking pins or hinge pins to retain the respective pins in their respective positions.

Each connector assembly 16 includes a U-shaped rod member 84 which includes threaded ends, a pair of rod-receiving apertures 86 in the transverse strut member 14, a brace plate 88 which includes apertures 89, and nuts 90 for connecting to the threaded ends of the U-shaped rod member 84.

In using the tow bar apparatus 10 of the invention, the transverse strut member 14 is first connected to an all terrain vehicle 11. More specifically, the transverse strut member 14 is placed next to vertical tubular portions of the vehicle to be towed 11 such that the rod-receiving apertures 86 of the transverse strut member 14 straddle the vertical tubular portions. Each of the U-shaped rod members 84 is placed around a portion of a vertical tubular portion, and the ends of the U-shaped rod member 84 are pushed through the U-shaped rod member 84. A brace plate 88 is placed on the ends of the U-shaped rod member 84 by passing the ends of the U-shaped rod member 84 through the apertures 89 of the brace plate 88. The nuts 90 are screwed onto the threaded ends of the U-shaped rod member 84 to secure the connector assemblies 16 to the transverse strut member 14. In this way, the tow bar apparatus 10 is attached to the vehicle to be towed 11.

When the tow bar apparatus 10 of the invention is used for towing the vehicle to be towed 11 by the towing vehicle (not shown), the distal end of the channel-received beam member 36 is pulled away from the transverse strut member 14 in a substantially horizontal orientation. More specifically, the main portion of the channel-received beam member 36 passes through the channel portion 28 of the joint assembly 26. The in-use mode of the invention is shown in FIG. 1. The towing-vehicle connection assembly 32 is connected to the towing vehicle. To connect the towing-vehicle connection assembly 32 to the towing vehicle, the towing-vehicle hinge pin 76 is removed, the pin apertures 74 are placed in registration with a complementary aperture or connection channel on the towing vehicle, and the towing-vehicle hinge pin 76 is placed through the pin apertures 74 of the plate members 70 and the complementary aperture or connection channel in the towing vehicle. Then a locking dip 35 is placed on the end of the towing-vehicle hinge pin 76. Also, the safety chain 42 is connected to the towing vehicle.

The towing-vehicle hinge pin 76, the first hinge pin 56, and the second hinge pin 66 permit the relative vertical positions between the towing vehicle and the vehicle to be towed 11 to vary during a towing operation. Such variations in the relative vertical positions between the towing vehicle and the vehicle to be towed 11 occur when the two vehicles move up and down hills and over bumpy roads.

The lock pin 46 is placed through the apertures 44 in the channel-received beam member 36, and a locking clip 35 is placed in the end of the lock pin 46. The lock pin 46 prevents the channel-received beam member 36 from is pushed too far in the direction of the vehicle to be towed 11 if the towing vehicle moves in a reverse direction. The in-use effective length of the tow bar apparatus 10 of the invention is the distance from the distal end of the channel-received beam member 36 to the transverse strut member 14 when the apparatus is in the in-use mode.

As shown in FIG. 3, the towing-vehicle connection assembly 32 has been disconnected from the towing vehicle. In addition, the hinged portions of the apparatus have been rotated upward around the first hinge assembly 18 and the second hinge assembly 20 so that the first beam member 22, the second beam member 24, and the telescopic beam assembly are oriented vertically. In addition, the lock pin 46 in the channel-received beam member 36 was removed to permit the locking portion of the channel-received beam member 36 to pass through the joint assembly 26. Then the lock pin 46 was placed back through the apertures 44 in the channel-received beam member 36 and the locking clip 35 was placed back on the end of the lock pin 46.

As shown in FIG. 2, the distal end of the channel-received beam member 36 has been pushed even closer to the transverse strut member 14 than depicted in FIG. 3. The storage-mode effective length of the tow bar apparatus 10 of the invention is the distance from the distal end of the channel-received beam member 36 to the transverse strut member 14 when the apparatus is in the storage mode. Clearly, the storage-mode effective length is less than the in-use effective length. In this way, when the tow bar apparatus 10 of the invention is in the storage mode, the invention takes up less space than when in the in-use mode.

The first hinge plate assembly 50 can be welded to the first beam member 22. The second hinge plate assembly 60 can be welded to the second beam member 24. The distal ends of the first beam member 22 and the second beam member 24 can be welded to the joint assembly 26. The plate members 70 of the towing-vehicle connection assembly 32 can be welded to the channel-received beam member 36.

The components of the telescoping tow bar apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved telescoping tow bar apparatus that is low in cost, relatively simple in design and operation, and which may advantageously be used for towing an all terrain vehicle by a motor vehicle. With the invention, a telescoping tow bar apparatus is provided which is carried by an all terrain vehicle. With the invention, a telescoping tow bar apparatus is provided which is especially adapted for towing an all terrain vehicle. With the invention, a telescoping tow bar apparatus is provided which can be reduced in its effective size in a storage mode. With the invention, a telescoping tow bar apparatus is provided which can be retrofitted to many currently in use all terrain vehicles. With the invention, a telescoping tow bar apparatus is provided which utilizes a triangular structure to provide strength and balance to the tow bar apparatus. With the invention, a telescoping tow bar apparatus is provided which does not require a person to lift the front end of the all terrain vehicle to utilize the towing apparatus. With the invention, a telescoping tow bar apparatus is provided which does not have telescopic sides in the triangular structure.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A tow bar apparatus for attachment to a vehicle to be towed, the apparatus comprising:

a vehicle attachment assembly which includes a transverse strut member and a pair of connector assemblies attached to the transverse strut member for attaching the vehicle attachment assembly to a vehicle to be towed;

a first hinge assembly connected to a first end of the transverse strut member, and a second hinge assembly connected to a second end of the transverse strut member;

a first beam member which includes a proximal end connected to the first end of the transverse strut member, and a second beam member which includes a proximal end connected to the second end of the transverse strut member;

a joint assembly connected to a distal end of the first beam member and to a distal end of the second beam member, wherein the joint assembly includes a channel portion;

a telescopic beam assembly extending through the channel portion of the joint assembly, the telescopic beam assembly including a towing-vehicle connection assembly connected to a distal end of the telescopic beam assembly and a stop member connected to a proximal end of the telescopic beam assembly;

wherein the telescoping beam assembly is rotatably and slidably directed through the channel portion such that the telescoping beam assembly can both rotate and slide relative to the joint assembly;

wherein each connector assembly includes:
a U-shaped rod member which includes threaded ends,
a pair of rod-receiving apertures in the transverse strut member,
a brace plate which includes apertures, and
nuts for connecting to the threaded ends of the U-shaped rod member.

2. The apparatus of claim 1 wherein the towing-vehicle connection assembly includes:
a pair of plate members attached to a distal end of the telescopic beam assembly, wherein the plate members include pin apertures, and
a towing-vehicle hinge pin received by the pin apertures in the plate members.

* * * * *